(No Model.)
C. H. CURTIS.
FRUIT CLIPPER.
No. 364,222. Patented June 7, 1887.
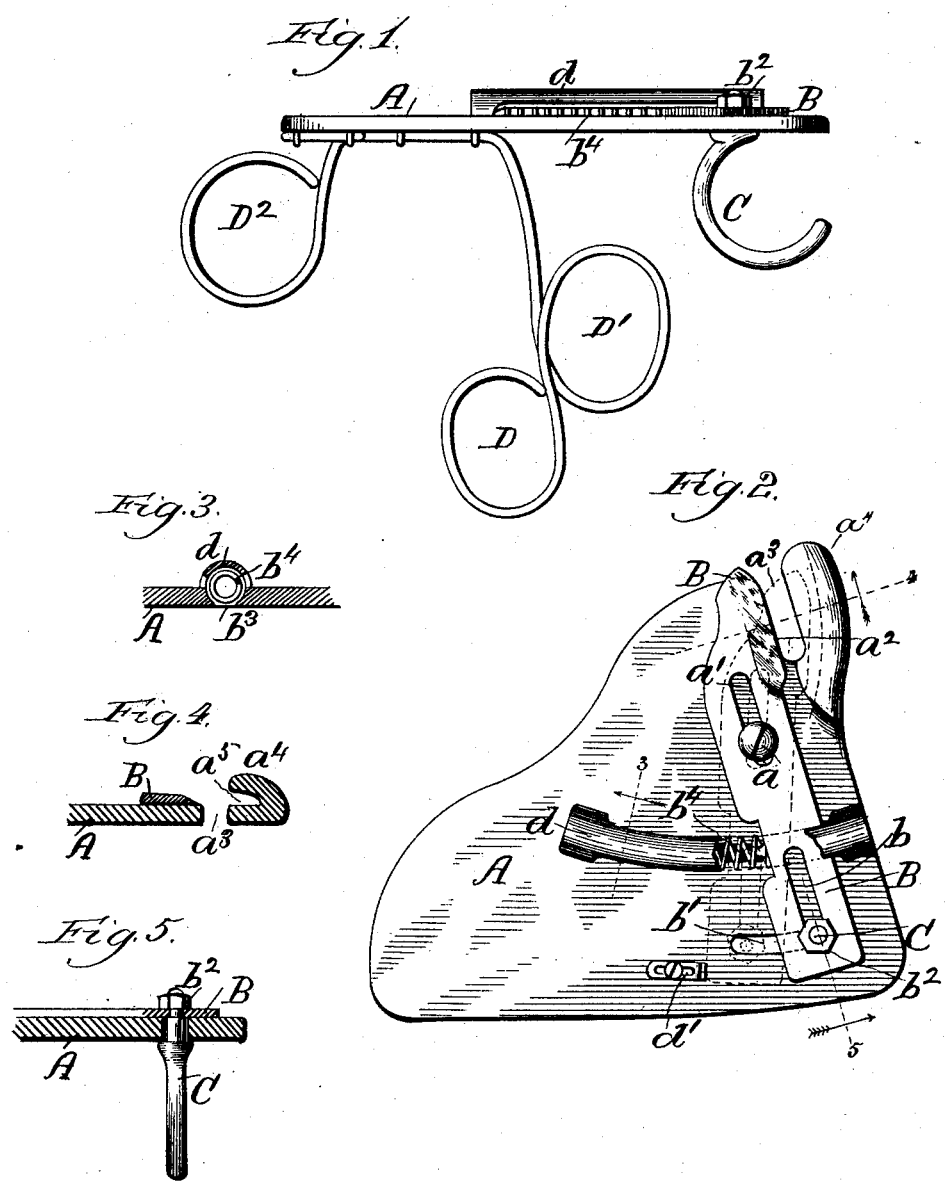
Witnesses
Chas. E. Gaylord.
L. M. Freeman
Inventor:
Chas. H. Curtis.
By L. B. Coupland & Co.
Attys.

UNITED STATES PATENT OFFICE.

CHARLES H. CURTIS, OF BLUFFTON, FLORIDA.

FRUIT-CLIPPER.

SPECIFICATION forming part of Letters Patent No. 364,222, dated June 7, 1887.

Application filed December 21, 1886. Serial No. 222,155. (No model.)

*To all whom it may concern:*

Be it known that I, CHARLES H. CURTIS, of Bluffton, county of Volusia, and State of Florida, have invented certain new and useful Improvements in Fruit-Clippers, of which the following is a full, clear, and exact description, that will enable others to make and use the same, reference being had to the accompanying drawings, forming a part of this specification.

The object of this invention is to provide a simple and convenient device for gathering fruit from the tree, the same being more especially intended for use in gathering oranges and fruits of a similar nature, where it is necessary to gently cut or sever the stem attaching the fruit to the tree in such a manner as to leave a portion of the stem attached to the fruit, and at the same time avoid injury to the branches or fruit.

The device consists of a triangular-shaped plate, on the upper side of which is mounted an adjustable cutting-blade, while the under side is provided with a number of loops for the insertion of the fingers when manipulating the device.

The means heretofore employed in severing the fruit from the stem have usually been of such a character as to require the use of both hands—one to grasp the fruit and the other to operate the cutting device. By means of the device herewith presented the fruit is grasped with the hand holding the clipper, thus leaving the other hand free to steady the person on the ladder or other means of support employed by the picker.

Figure 1 is a side elevation of a device embodying my improved features; Fig. 2, a view of the upper side; Fig. 3, a sectional detail in the plane 3, Fig. 2, showing the relative position of a spring for returning the cutting-blade to a normal position; and Figs. 4 and 5 are sectional views in the planes 4 and 5, Fig. 2, illustrating details of construction.

In the drawings, A represents a plate or body, which may be of a triangular or other suitable shape, and will ordinarily be composed of metal. On the upper side of the plate A is mounted the reciprocating cutting-blade B, (see Fig. 2,) which is secured in position relative to said plate by means of the pivot pin or screw $a$. This pin or screw forms the pivotal bearing upon which the cutting-blade vibrates, the pin passing through the aperture $a'$ in said blade. The beveled cutting-edge $a^2$ of the blade B traverses the notch $a^3$ in the front edge of the plate A, as shown in Figs. 2 and 4. This corner of the plate is provided with the raised part $a^4$, having the recess $a^5$, into which the cutting-edge of the blade passes during the process of cutting the stem. This raised part may be dispensed with and the edge of the blade may pass over the surface of the plate A. By having this raised part, however, a bearing is provided for the stem of the fruit above as well as below the knife and insures a cleaner and more positive cut.

It will be observed that the arrangement and operation of the blade are such as to have a shearing cut, and thus be less liable to break or detach the stem from the fruit.

The rear end of the blade B has the aperture $b$, corresponding to the aperture $a'$ in the opposite or front end.

The slightly-curved elongated slot $b'$ in the plate A extends at right angles to the slot $b$ and receives the inner end of the curved handle C, as shown in Figs. 1, 2, and 5.

The inner end of the handle C is screw-threaded and extends far enough through the knife-blade B to receive the clamping-nut $b^2$. The opposite end of this handle, projecting from the under side of the plate A, is curved to receive the forefinger of the operating-hand, by which means the required vibratory motion is conveniently imparted to the cutting-blade.

The plate A is provided with the slot or channel $b^3$ (see Fig. 3) for the reception of the spiral spring $b^4$. This slot is contracted in the direction of the under side, so as to prevent the spring from passing through, but leaves an opening for the free escape of any loose matter that may find its way into the spring. This spring is retained in place by means of the cap $d$, and serves to return the cutting-blade to the normal position (shown in Fig. 2) after the cutting of each stem, the dotted lines indicating the opposite position.

$d'$ is an adjustable stop which gages the throw or travel of the cutting-blade.

The loops D D' D², projecting from the under side of the plate A, are formed from a single piece of wire, which is properly secured to said plate, as shown in Fig. 1. These loops are arranged so as to conform to the position of the fingers.

In operating the device will be held in a horizontal position, or nearly so, resting just above the upper side of the thumb and forefinger. In placing the same on the hand the third finger is inserted in the loop D, the second or middle finger in the companion loop D', the thumb in the loop $D^2$, the forefinger engaging with the handle C of the cutting-blade. The stem of the fruit passes into the notch $a^3$, where it is severed, while the fingers project far enough through the loop-handles to grasp the fruit, thus leaving the other hand free to perform such service as may be required.

Having thus described my invention, what I claim as new, and desire to secure by Letters Patent, is—

1. In a fruit-clipper, the plate A, provided with the notch $a^3$, the raised part $a^4$, having the recess $a^5$, and the slot $b'$, in combination with the vibrating cutting-blade B, pivoted to said plate, the handle C, and the spring $b^4$, secured to said plate and having a bearing on said cutting-blade, substantially as and for the purpose set forth.

2. In a fruit-clipper, the combination, with the plate A, provided with the aperture or slot $b^3$, of the spring $b^4$, resting in said slot, the cap $d$, and the vibrating cutting-blade B, substantially as and for the purpose set forth.

3. A fruit-clipper consisting of the plate A, the vibrating cutting-blade B, pivoted to said plate, the handle C, the spring $b^4$, secured to said plate and bearing against said blade, and the finger-loops, as described, all combined and arranged to operate as and for the purpose set forth.

CHARLES H. CURTIS.

Witnesses:
J. C. BAKER,
O. E. HEACOCK.